UNITED STATES PATENT OFFICE.

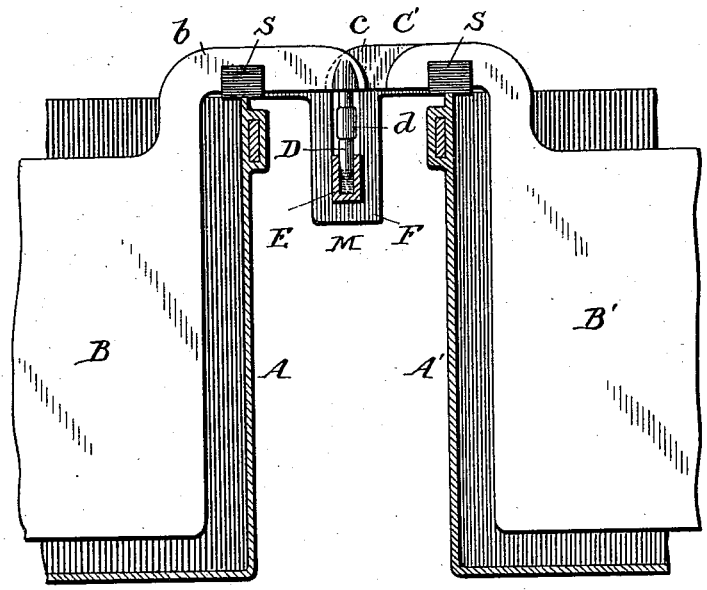

ROBERT McA. LLOYD, OF NEW YORK, N. Y.

CONNECTION FOR STORAGE BATTERIES.

SPECIFICATION forming part of Letters Patent No. 560,272, dated May 19, 1896.

Application filed November 16, 1895. Serial No. 569,203. (No model.)

*To all whom it may concern:*

Be it known that I, ROBERT McA. LLOYD, a citizen of the United States, residing at New York, in the county of New York and State of New York, have invented certain new and useful Improvements in Connections for Storage Batteries, of which the following is a specification.

My invention relates to connections for storage or secondary batteries; and it has for its object to provide a construction which will overcome some of the disadvantages of such connections and at the same time be exceedingly simple, cheap, and effective; and it consists in the features of construction substantially as hereinafter more particularly pointed out.

Referring to the accompanying drawings, Figure 1 is a detail view, partly in section, showing an embodiment of my invention. Fig. 2 is a sectional view showing two battery-cells arranged in juxtaposition and the electrodes provided with my improved connections, and Fig. 3 is a plan view of the same.

In modern practice with electrical secondary or storage batteries it has been found desirable and practically necessary to so arrange the batteries that the individual plates or electrodes constituting the battery can be removed from the cell independently of the others for the purposes of repairs, examination, replacing, or otherwise, and in doing this it is convenient and practically necessary to have a simple and effective means of connecting the various elements or plates of the cells in an electric circuit, so that an individual element or plate can be removed or replaced without the necessity of disturbing the electric connections of the remaining plates in the same cell or in contiguous cells. One of the most advantageous arrangements for accomplishing these results consists in providing each individual element or plate with an extension projecting outside of the cell and which is adapted to be inserted in a body of mercury contained in a suitable receptacle, into which body of mercury the other plates of the same cell or of the contiguous cell, or both, may be inserted or removed to complete the electric connection. These pins are usually made of copper and are secured to or formed or cast into the body of the element, which is usually of lead or some equivalent material. These copper connections or pins have been found to be the most satisfactory means of connecting the elements or plates together, especially in connection with the mercury contacts, but it has been found that the mercury has a tendency to creep up the pin to its joint with the lead plate and to disintegrate or eat away the lead until the joint is destroyed, or at least disintegrated to a greater or less extent, so that it tends to offer resistance to the passage of the electric current, which is a serious detriment to this class of batteries, in which the internal resistance should be reduced to the lowest practical conditions. Where, as is common, a number of batteries are arranged in juxtaposition and connected together to produce the desired amount of current there are more or less acid fumes present resulting from the electrolytic action of the battery, and these fumes are sufficient to attack the copper and cause the mercury to creep along the copper pins, as before intimated, and injure the connections.

The object of my invention is to overcome this difficulty, and this I accomplish by enameling the connection or pin at points between its contact with the plate or element and the mercury contact, and this I have found effectually prevents all damage or injury from the difficulty above recited.

In order that my invention and its application may be well understood, I have shown the preferred form of applying it in the accompanying drawings, as well as one of the preferred ways of using the connections or pins, and in the drawings A A' represent the cells or cases of the secondary or storage batteries, containing the positive plates B B' and the negative plates or elements C C', and these elements are each provided with projections or extensions $b$ $c$, which preferably form means of supporting the elements, these projections resting on the edges of the cases A A'. Secured to these projections are the connectors or pins D, which, as above intimated, are preferably of copper, and which are also, preferably, cast or formed into the projections, so as to make good electric contact therewith, although, of course, they may be otherwise applied. In the present instance these connectors or pins project into a trough E, which may be of copper or similar material and holds a quantity of mercury M, or may be provided with a series of openings or cups $e$, each of which contains mercury, and each of which receives a separate pin or connector. This trough or hollow bar may be supported in any way, being shown in the present instance as mounted on struts F, extending across the space between two adjacent battery-cells, and it will be seen that in this arrangement this trough or connecting-bar is adapted to receive the positive element B of one cell and the negative element C' of the adjacent battery-cell, although, of course, it may be used simply to connect all the positive or negative elements of a single cell. These struts or bars F are preferably made of insulating material or are suitably insulated from the cells, and the projections $b$ $c$ in the present instance are shown as provided with hard-rubber sleeves S, interposed between the projections and the cells in order to thoroughly and effectually insulate them.

The pins D are provided with a coating $d$ of enamel, and this is shown as arranged on the pins or connections between their respective contact ends, and it may be of any well-known vitrifiable enamel, and it is preferably applied to and burned onto the pins before they are secured to the projections of the elements. This band or coating of enamel around the copper connections effectually prevents the creeping of the mercury above referred to, and I have found it possible to maintain good and complete electric contact for an indefinite length of time by simply applying this enamel coating or band in the manner above described.

I may remark that heretofore I have tried to protect the pins or connections by painting them or by japanning them or varnishing them; but all such coverings have proved inefficient and impracticable in practice, as, owing to the acid fumes or otherwise, they soon crack or peel off and eventually leave the pins exposed, so that the mercury can creep up the pins and destroy the connections, while the enamel coating produces most satisfactory results and prevents the destruction or injury of the pins.

While I have thus described and illustrated my invention as applied to a particular form of connections in a defined arrangement of secondary batteries, it is evident that my invention is not limited to this particular form or arrangement, as it may be applied to connections otherwise arranged and subjected to the same or similar influences, and it is manifest that those skilled in the art can utilize my invention in other connections without departing from the spirit thereof.

What I claim is—

The combination with a secondary-battery element having a projection and with a contact containing mercury, of a copper connector secured to the projection and engaging the mercury and provided with a band of enamel between the projection and mercury contact, substantially as described.

In testimony whereof I have signed my name to this specification in the presence of two subscribing witnesses.

ROBERT McA. LLOYD.

Witnesses:
W. P. BELKNAP,
JOHN H. LOW.